US012746784B2

(12) United States Patent
Sawakami

(10) Patent No.: US 12,746,784 B2
(45) Date of Patent: Sep. 29, 2026

(54) TIRE

(71) Applicant: Sumitomo Rubber Industries, Ltd., Kobe (JP)

(72) Inventor: Isao Sawakami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 18/923,738

(22) Filed: Oct. 23, 2024

(65) Prior Publication Data

US 2025/0153515 A1 May 15, 2025

(30) Foreign Application Priority Data

Nov. 10, 2023 (JP) ................................ 2023-192459

(51) Int. Cl.
*B60C 15/06* (2006.01)
*B60C 13/00* (2006.01)

(52) U.S. Cl.
CPC .......... *B60C 15/0653* (2013.01); *B60C 13/00* (2013.01); *B60C 2013/007* (2013.01); *B60C 2015/0621* (2013.01); *B60C 2015/066* (2013.01); *B60C 2015/0664* (2013.01)

(58) Field of Classification Search
CPC ............ B60C 15/06; B60C 2015/0614; B60C 2015/0617; B60C 15/0628; B60C 15/0632
See application file for complete search history.

(56) References Cited

U.S. PATENT DOCUMENTS

| | | | | |
|---|---|---|---|---|
| 4,810,116 A * | 3/1989 | Schulze | B41J 35/36 | 400/208 |
| 5,353,856 A * | 10/1994 | Kishi | B60C 11/00 | 152/534 |
| 5,445,203 A * | 8/1995 | Saito | B60C 11/00 | 152/526 |

FOREIGN PATENT DOCUMENTS

| | | | |
|---|---|---|---|
| JP | H09-286211 A | | 11/1997 |
| JP | 3803174 | * | 8/2006 |
| JP | 4170821 | * | 10/2008 |
| JP | 7200680 | * | 1/2023 |

* cited by examiner

*Primary Examiner* — Justin R Fischer
(74) *Attorney, Agent, or Firm* — XSENSUS LLP

(57) ABSTRACT

A tire can include a pair of beads, a carcass, a pair of sidewall layers, and a belt. One carcass ply constituting the carcass can include a ply body and a pair of turned-up portions. A radial height of each turned-up portion can be not greater than 17% of a cross-sectional height of the tire. An average thickness F of the sidewall layer in a zone can satisfy the following formula (1) represented using a constant B, a cross-sectional width SW of the tire, and a width BW of the belt, and the constant B can satisfy the following formula (2) represented using an aspect ratio RA of the tire:

$$416\times(BW/SW-B)^2+4\leq F\leq 416\times(BW/SW-B)^2+6, \text{ and} \qquad \text{Formula (1)}$$

$$B=0.84\times(-0.49\times RA/100+1.22). \qquad \text{Formula (2)}$$

18 Claims, 4 Drawing Sheets

TIRE

CROSS-REFERENCE TO RELATED APPLICATION

The present application claims priority to Japanese patent application JP 2023-192459, filed on Nov. 10, 2023, the entire contents of which are incorporated herein by reference in its entirety.

BACKGROUND

Field

The present disclosure relates to a tire. Specifically, the present disclosure relates to a tire that is mountable to a passenger car.

Background Art

The mass of a tire can influence rolling resistance. In consideration of influence on the environment, tires having reduced rolling resistance may be desirable or required.

If the number of carcass plies constituting a carcass is reduced, the lengths of turned-up portions of the carcass plies may be shortened, etc., in order to reduce tire mass, and the stiffness of each bead portion may be decreased.

A large load may act on each bead portion of a tire. In addition, during running, deformation and restoration may be repeated in the tire. There may be a concern that the bead portion is likely to be damaged. Improvement of the durability of the bead portion may be desirable or required.

For example, if a new element is incorporated into each bead portion in order to improve the durability of each bead portion, the mass of the tire may be increased.

Therefore, various studies have been conducted in order to establish a technology capable of maintaining the durability of each bead portion while achieving mass reduction of the tire (e.g., Japanese Laid-Open Patent Publication No. H09-286211).

SUMMARY

A tire according to an aspect of the present disclosure can be a HIGH LOAD CAPACITY type tire specified in the ETRTO STANDARDS MANUAL 2021. The tire can include: a pair of beads; a carcass extending on and between the pair of beads; a pair of sidewall layers located axially outward of the carcass; and a belt located radially outward of the carcass. The pair of beads each can include a core and an apex located radially outward of the core. The carcass can be composed of one carcass ply. The carcass ply can include a ply body extending between a pair of the cores and a pair of turned-up portions connected to the ply body and turned up at the respective cores. Each of radial heights of the pair of turned-up portions may be not greater than 17% of a cross-sectional height of the tire. An average thickness F of the sidewall layer in a zone where a distance in a radial direction from a bead base line is 20 mm to 30 mm can satisfy the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (2) represented using an aspect ratio RA of the tire, $$416\times(BW/SW-B)^2+4\leq F\leq 416\times(BW/SW-B)^2+6,\ \text{and} \quad \text{formula (1)}$$

$$B=0.84\times(-0.49\times RA/100+1.22). \quad \text{formula (2)}$$

DETAILED DESCRIPTION

Figure 1:
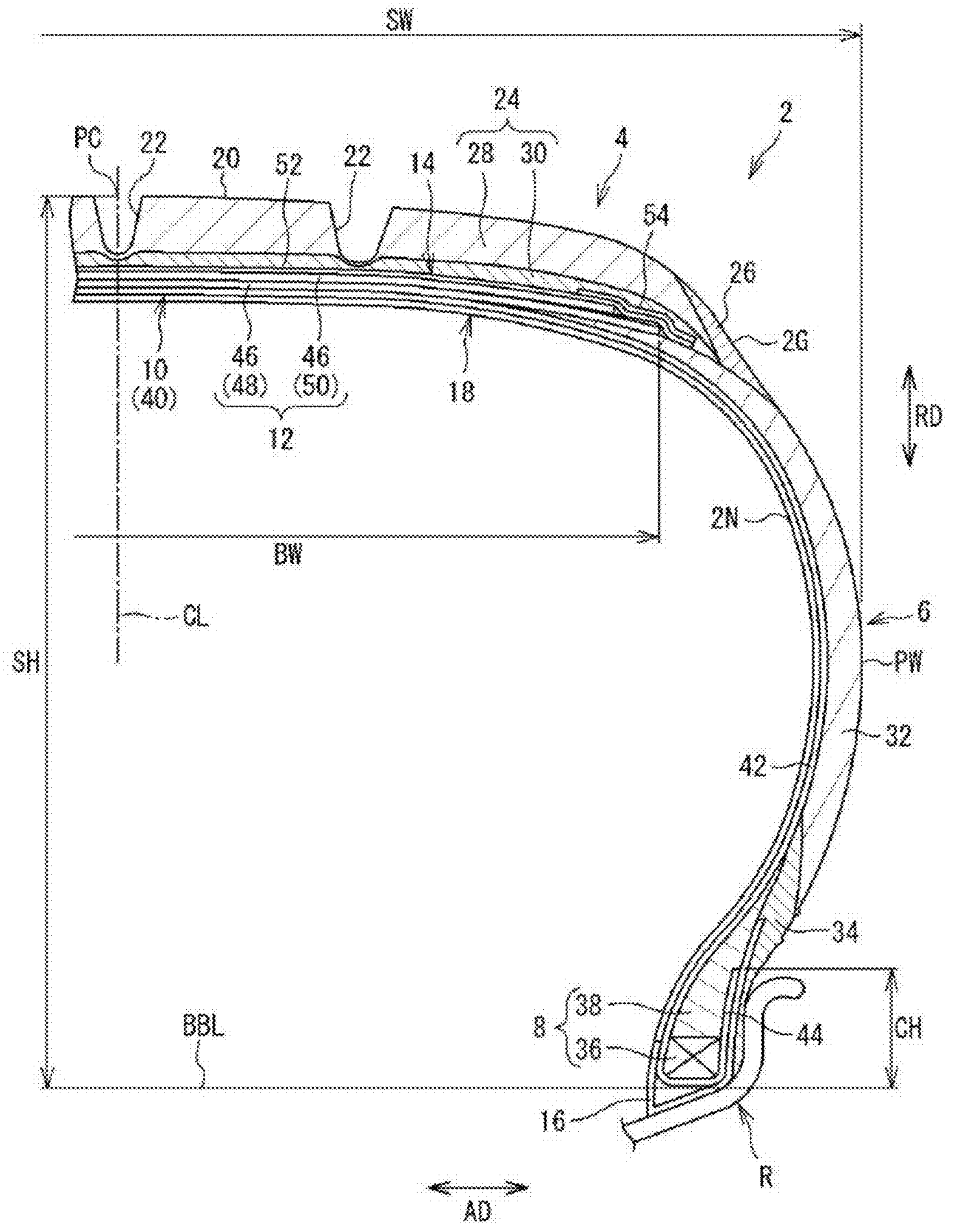
FIG. 1 is a cross-sectional view showing a part of a tire according to one or more embodiments of the present disclosure.

A tire of embodiments the present disclosure can be fitted on a rim. The interior of the tire can be filled with air to adjust the internal pressure of the tire. The tire fitted on the rim may also be referred to as tire-rim assembly. The tire-rim assembly can include the rim and the tire fitted on the rim.

An object of one or more embodiments of the present disclosure, according to one or more objects, can be to provide a tire that can achieve improvement of durability without an increase in mass.

Thus, according to one or more embodiments of the present disclosure, a tire that can achieve improvement of durability without an increase in mass, can be obtained.

In the present disclosure, a state where a tire is fitted on a standardized rim, the internal pressure of the tire is adjusted to a standardized internal pressure, and no load is applied to the tire can be regarded as or referred to as standardized state.

A state where the tire is fitted on the standardized rim, the internal pressure of the tire is adjusted to 290 kPa, and no load is applied to the tire can be regarded as or referred to as reference state.

In the present disclosure, unless otherwise specified, the dimensions and angles of each component of the tire can be regarded as measured in the standardized state.

The dimensions and angles of each component in a meridian cross-section of the tire, which cannot be measured in a state where the tire is fitted on the standardized rim, can be measured in a cut plane of the tire obtained by cutting the tire along a plane including a rotation axis. In this measurement, the tire can be set such that the distance between right and left beads is equal to the distance between the beads in the tire that is fitted on the standardized rim. The configuration of the tire that cannot be confirmed in a state where the tire is fitted on the standardized rim can be confirmed in the above-described cut plane.

The standardized rim can be regarded as or mean a rim specified in a standard on which the tire is based. The term "standard rim" in the JATMA standard, the "Design Rim" in the TRA standard, and the "Measuring Rim" in the ETRTO standard can be regarded as standardized rims.

The standardized internal pressure can be regarded as or mean an internal pressure specified in the standard on which the tire is based. The term "highest air pressure" in the JATMA standard, the "maximum value" recited in the "TIRE LOAD LIMITS AT VARIOUS COLD INFLATION PRESSURES" in the TRA standard, and the "INFLATION PRESSURE" in the ETRTO standard can be regarded as standardized internal pressures.

A standardized load can be regarded as or mean a load specified in the standard on which the tire is based. The term "maximum load capacity" in the JATMA standard, the "maximum value" recited in the "TIRE LOAD LIMITS AT VARIOUS COLD INFLATION PRESSURES" in the TRA standard, and the "LOAD CAPACITY" in the ETRTO standard can be regarded as standardized loads.

In the present disclosure, unless otherwise specified, a load index (LI) can be regarded as a load index for a HIGH LOAD CAPACITY type tire (hereinafter referred to as HLC type tire) specified in the ETRTO STANDARDS MANUAL 2021, and can be an index representing a maximum mass allowed to be applied to the tire under specified conditions, that is, a maximum load capacity, as an index number.

According to one or more embodiments of the present disclosure, a tread portion of the tire can be a portion of the tire that comes into contact with a road surface. A bead portion can be a portion of the tire that is fitted to a rim. A sidewall portion can be a portion of the tire that extends between the tread portion and the bead portion. According to one or more embodiments, the tire can include a tread portion, a pair of bead portions, and a pair of sidewall portions as portions thereof.

[Findings on Which One or More Embodiments of the Present Disclosure Can Be Based]

Electric vehicles are becoming increasingly widespread due to environmental considerations. Electric vehicles are equipped with batteries. Batteries enabling travelling for a distance of around 500 km may be regarded as heavy. Therefore, electric vehicles tend to be heavier than conventional gasoline-powered vehicles. Thus, higher loads can act on tires mounted on electric vehicles, than on tires mounted on gasoline-powered vehicles.

In order to provide tires that can support higher loads, the load index has been reviewed in the ETRTO standards, and a HIGH LOAD CAPACITY type (hereinafter referred to as HLC type) tire has been introduced as a new category.

To qualify a tire as an HLC type tire, according to the ETRTO standard, for instance, the tire is required to be able to support a higher load than conventional tires.

To achieve this, the stiffness of the tire can be increased. However, if the stiffness of the tire is increased, there may be a concern that the mass of the tire is increased as described above.

Therefore, as a result of checking the ratio of a belt width to the cross-sectional width of a tire and the thickness of a sidewall layer in each bead portion, the present inventor has found that both are correlated and that if the belt width is in an appropriate range with respect to the cross-sectional width of the tire, the sidewall layer in each bead portion can be decreased while the required stiffness can be provided to the tire even though a carcass that is composed of one carcass ply and has a low turned-up structure is adopted, leading to completion of one or more embodiments of the disclosed subject matter described below. Here, according to one or more embodiments of the present disclosure, composed of one carcass ply may mean only one carcass ply and/or the carcass consists of a single carcass ply.

[Outline of One or More Embodiments of Present Disclosure]

One or more embodiments of the present disclosure can be regarded as being directed to a HIGH LOAD CAPACITY type tire specified in the ETRTO STANDARDS MANUAL 2021, where the tire can include: a pair of beads; a carcass extending on and between the pair of beads; a pair of sidewall layers located axially outward of the carcass; and a belt located radially outward of the carcass, wherein the pair of beads can each include a core and an apex located radially outward of the core, the carcass can be composed of one carcass ply, the carcass ply can include a ply body extending between a pair of the cores and a pair of turned-up portions connected to the ply body and turned up at the respective cores, each of radial heights of the pair of turned-up portions can be not greater than 17% of a cross-sectional height of the tire, an average thickness F of the sidewall layer in a zone where a distance in a radial direction from a bead base line is 20 mm to 30 mm can satisfy the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (2) represented using an aspect ratio RA of the tire, $$416\times(BW/SW-B)^2+4\leq F\leq 416\times(BW/SW-B)^2+6,\text{ and} \qquad \text{formula (1)}$$

$$B=0.84\times(-0.49\times RA/100+1.22). \qquad \text{formula (2)}$$

The tire of one or more embodiments of the present disclosure can achieve improvement of durability without an increase in mass. The mechanism by which this effect is achieved can be regarded as or based on as follows.

In a rolling tire, compressive deformation is repeated at a surface portion in a zone ZF. A carcass is likely to be influenced by the compressive deformation, so that a countermeasure generally may be taken to suppress the influence of the compressive deformation on the carcass, by thickening a sidewall layer in the zone ZF and placing the carcass away from the surface of the tire. However, with this countermeasure, it may be difficult to achieve mass reduction of the tire and there may also be a concern that the durability of the tire is decreased due to promotion of heat storage. Therefore, in the conventional tire, the thickness of the sidewall layer in the zone ZF may be set in the range of 6 to 12 mm.

In contrast, in the tire of one or more embodiments of the present disclosure, when the average thickness F of the sidewall layer in the zone ZF satisfies the above-described formula (1), the width BW of the belt and the thickness of the sidewall layer in the zone ZF can be well balanced. The average thickness F of the sidewall layer which can be commensurate with the width BW of the belt can be set. In other words, this tire can optimize the average thickness F while reducing compressive strain generated in the carcass. Since the average thickness F can be set at the required thickness, the tire can achieve mass reduction. Since compressive strain generated in the carcass can be reduced, this tire can meet the requirements of the HLC standard. In particular, by setting the ratio (BW/SW) of the width BW of the belt to the cross-sectional width SW of the tire to be equal to the constant B represented by the formula (2), the tire can meet the requirements of the HLC standard, for instance, even if the average thickness F of the sidewall layer in the zone ZF is set to 4 to 6 mm.

Even under a situation where the carcass is composed of one carcass ply and in which the radial height of each turned-up portion is set to be not greater than 17% of the cross-sectional height of the tire can be adopted, the tire can allow the sidewall layer at each bead portion to be effectively made thinner while having the stiffness required to meet the requirements of the HLC standard.

This tire can achieve improvement of durability without an increase in mass.

According to one or more embodiments, each of the radial heights of the pair of turned-up portions can be not less than 10 mm and not greater than 20 mm, for instance. Accordingly, the carcass ply is firmly fixed at each bead. Since the carcass can sufficiently exhibit its function(s), the carcass can contribute to ensuring the stiffness required for the tire to meet the requirements of the HLC standard. Since an end of each turned-up portion can be placed away from the vicinity of the zone ZF where large compressive strain is generated, occurrence of damage starting from the end of the turned-up portion can be suppressed. The tire can have good durability.

According to one or more embodiments, an angle of each of the turned-up portions with respect to the radial direction in the reference state can be not less than 15 degrees, for instance.

Accordingly, deformation of each turned-up portion due to the action of a load can be effectively suppressed. Since damage starting from the end of the turned-up portion can be suppressed, the tire can have good durability.

According to one or more embodiments, the belt can include a large number of belt cords aligned with each other, and an angle of each of the belt cords with respect to an equator plane in the reference state can be not less than 20 degrees and not greater than 32 degrees, for instance. Accordingly, the belt can effectively contribute to inhibiting the contour of the carcass from being distorted.

Details of Embodiments of Present Disclosure

Hereinafter, one or more embodiments of the present disclosure will be described in detail based on preferred embodiments with appropriate reference to the drawings.

FIG. 1 shows a part of a tire 2 according to one or more embodiments of the present disclosure. The tire 2, according to one or more embodiments, can be a pneumatic tire for a passenger car. The tire 2 can be a HIGH LOAD CAPACITY type tire specified in the ETRTO STANDARDS MANUAL 2021, according to one or more (e.g., all) embodiments of the present disclosure.

FIG. 1 shows a part of a cross-section, of the tire 2, along a plane including the rotation axis of the tire 2. The cross-section shown in FIG. 1 may also be referred to as meridian cross-section. A direction indicated by a double-headed arrow AD is the axial direction of the tire 2. The axial direction of the tire 2 can be regarded as or mean a direction parallel to the rotation axis of the tire 2. A direction indicated by a double-headed arrow RD is the radial direction of the tire 2. A direction perpendicular to the drawing sheet of FIG. 1 is the circumferential direction of the tire 2.

An alternate long and short dash line CL extending in the radial direction, such as shown in FIG. 1, can represent the equator plane of the tire 2.

FIG. 1 shows the tire 2 fitted on a rim R. The space between the tire 2 and the rim R can be filled with air, for example, to adjust the internal pressure of the tire 2. The rim R can be a standardized rim. The state of the tire 2 shown in FIG. 1 can be the above-described reference state.

A solid line BBL extending in the axial direction, such as shown in FIG. 1, can be a bead base line. This bead base line BBL can be a line that defines the rim diameter (see JATMA or the like) of the rim R.

A position indicated by reference character PC, such as shown in FIG. 1, can be the point of intersection of an outer surface 2G of the tire 2 (specifically, a tread surface described later) and the equator plane CL. The point of intersection PC can be the equator of the tire 2.

As shown in FIG. 1, in the case where a groove is located on the equator plane CL, the equator PC can be specified on the basis of a virtual outer surface obtained on the assumption that no groove is provided thereon. The equator PC can be the radially outer end of the tire 2. The equator PC of the tire 2 can be specified in the tire 2 in the reference state.

A length indicated by a double-headed arrow SH, such as shown in FIG. 1, can be the cross-sectional height of the tire 2. The cross-sectional height SH can be represented as the distance in the radial direction from the bead base line BBL to the equator PC of the tire 2.

The cross-sectional height SH of the tire 2 can be represented as the product of a nominal cross-sectional width and a nominal aspect ratio.

According to one or more embodiments of the present disclosure, the "nominal cross-sectional width" and the "nominal aspect ratio" can be regarded as or mean the "nominal cross-sectional width" and the "nominal aspect ratio" included in the "tyre designation" specified in, for instance, JIS D4202 "Automobile tyres-Designation and dimensions." For example, in the case where the tire size of the tire 2 is 205/55R16, the tire 2 can have a nominal cross-sectional width of 205 mm and a nominal aspect ratio of 55%. In this case, the cross-sectional height SH of the tire 2 can be 112.75 mm.

A position indicated by reference character PW, such as shown in FIG. 1, can be an axially outer end (hereinafter referred to as outer end PW) of the tire 2. In the case where decorations such as patterns and letters are present on the outer surface 2G, the outer end PW can be specified on the basis of a virtual outer surface obtained on the assumption that the decorations are not present thereon.

A length indicated by a double-headed arrow SW, such as shown in FIG. 1, can be the cross-sectional width of the tire 2. The cross-sectional width SW can be represented as the distance in the axial direction from a first outer end PW to a second outer end PW. The cross-sectional width SW can also be the maximum width of the tire 2, according to one or more embodiments of the present disclosure. The outer end PW can be a position where the maximum width SW is indicated, and can also be referred to as maximum width position PW. The cross-sectional width SW of the tire 2 can be specified in the tire 2 in the reference state.

The tire 2 can include a tread 4, a pair of sidewall layers 6, a pair of beads 8, a carcass 10, a belt 12, a band 14, a pair of chafers 16, and an inner liner 18.

The tread 4 can be located radially outward of the carcass 10. The tread 4 can be formed from a crosslinked rubber. The tread 4 can come into contact with a road surface at a tread surface 20 thereof. The tread 4 can have the tread surface 20. The outer surface 2G of the tire 2 can include the tread surface 20.

On the tread 4, grooves 22 can be formed. Accordingly, a tread pattern can be formed.

The tread 4 can have a tread body 24 and a pair of wings 26.

Each wing 26 can be located between the tread body 24 and the sidewall layer 6. The tread body 24 and the sidewall layer 6 can be joined via the wing 26. The wing 26 can be formed from a crosslinked rubber for which adhesiveness may be taken into consideration. The tread body 24 can include a cap portion 28 and a base portion 30.

The cap portion 28 can include the tread surface 20. The cap portion 28 can come into contact with a road surface. The cap portion 28 can be formed from a crosslinked rubber for which wear resistance and/or grip performance can be taken into consideration.

The base portion 30 can be located radially inward of the cap portion 28. The base portion 30 can be covered with the cap portion 28. According to one or more embodiments of the present disclosure, the base portion 30 can be formed from a crosslinked rubber that has low heat generation properties, according to one or more embodiments of the present disclosure.

Each sidewall layer 6 can be connected to the tread 4. The sidewall layer 6 can be located radially inward of the tread 4. The sidewall layer 6 can be located axially outward of the carcass 10. The sidewall layer 6 can have a sidewall body 32 and a clinch 34.

The sidewall body 32 can be connected to the tread 4. According to one or more embodiments of the present disclosure, the sidewall body 32 can be formed from a crosslinked rubber for which cut resistance can be taken into consideration.

The clinch 34 can be located radially inward of the sidewall body 32. The clinch 34 can come into contact with the rim R. According to one or more embodiments of the present disclosure, the clinch 34 can be formed from a crosslinked rubber for which wear resistance can be taken into consideration.

Each bead 8 can be located radially inward of the sidewall layer 6. Specifically, the bead 8 can be located radially inward of the sidewall body 32, and can be located axially inward of the clinch 34.

The bead 8 can include a core 36 and an apex 38. The core 36 can extend in the circumferential direction. The core 36 can include a steel wire. The apex 38 can be located radially outward of the core 36. The apex 38 can be formed from a crosslinked rubber that has high stiffness. When one bead 8 out of the pair of beads 8 is a first bead 8, the other bead 8 can be regarded or referred to as a second bead 8.

The carcass 10 can be located inward of the tread 4 and the pair of sidewall layers 6. The carcass 10 extends on and between the pair of beads 8. The carcass 10 extends on and between the first bead 8 and the second bead 8.

The carcass 10 can be composed of one carcass ply 40. The carcass 10 of the tire 2 can be lighter than a carcass including two or more carcass plies 40.

The carcass ply 40 can be turned up from the inner side to the outer side in the axial direction at each bead 8. The carcass ply 40 can include a ply body 42 extending between a pair of the cores 36 and a pair of turned-up portions 44 connected to the ply body 42 and turned up at the respective cores 36.

A length indicated by a double-headed arrow CH, such as shown in FIG. 1, can be the radial height of the turned-up portion 44. The radial height CH of the turned-up portion 44 can be represented as the distance in the radial direction from the bead base line BBL to an end of the turned-up portion 44.

The end of the turned-up portion 44 of the tire 2 can be located radially inward of the maximum width position PW. For example, the radial height CH of the turned-up portion 44 can be not greater than 17% of the cross-sectional height SH of the tire 2. The carcass 10 of the tire 2 can be regarded as having a low turned-up structure (LTU structure). As described above, the carcass 10 can be composed of one carcass ply 40. The carcass 10 can contribute to reducing the mass of the tire 2. From this viewpoint, the radial height CH of the turned-up portion 44 can be not greater than 15% of the cross-sectional height SH of the tire 2.

The carcass ply 40 can include a relatively large number of carcass cords aligned with each other. These carcass cords can intersect the equator plane CL. The carcass cords extend on and between the first bead 8 and the second bead 8. The carcass 10 of the tire 2 can have a radial structure.

In the tire 2, a cord formed from an organic fiber can be used as each carcass cord. Examples of the organic fiber can include nylon fibers, rayon fibers, polyester fibers, and aramid fibers.

The belt 12 can be located radially inward of the tread 4. The belt 12 can be located radially outward of the carcass 10. The belt 12 can be stacked on the carcass 10.

A double-headed arrow BW, such as shown in FIG. 1, can indicate the width of the belt 12. The width BW of the belt 12 can be represented as the distance in the axial direction from one end to the other end of the belt 12.

In the tire 2, the ratio BW/SW of the width BW of the belt 12 to the cross-sectional width SW of the tire 2 can be not less than 0.65 and not greater than 1.00, as an example. According to one or more embodiments, the ratio BW/SW can be not less than 0.70 and not greater than 0.95.

The belt 12 can include a plurality of belt plies 46 aligned in the radial direction. The plurality of belt plies 46 can include an inner belt ply 48 located on the innermost side and an outer belt ply 50 located on the outermost side. The belt 12 of the tire 2 can be composed of two belt plies 46, as an example. Specifically, the belt 12 can be composed of the inner belt ply 48 and the outer belt ply 50.

The inner belt ply 48 can be stacked on the carcass 10 on the radially inner side of the tread 4. The outer belt ply 50 can be stacked on the inner belt ply 48.

As shown in FIG. 1, each end of the outer belt ply 50 can be located axially inward of an end of the inner belt ply 48. The outer belt ply 50 can be narrower than the inner belt ply 48. The length from the end of the outer belt ply 50 to the end of the inner belt ply 48 can be not less than 3 mm and not greater than 10 mm, according to one or more embodiments of the present disclosure. The above-described width BW of the belt 12 can be represented as the width of the wider inner belt ply 48.

Figure 2:
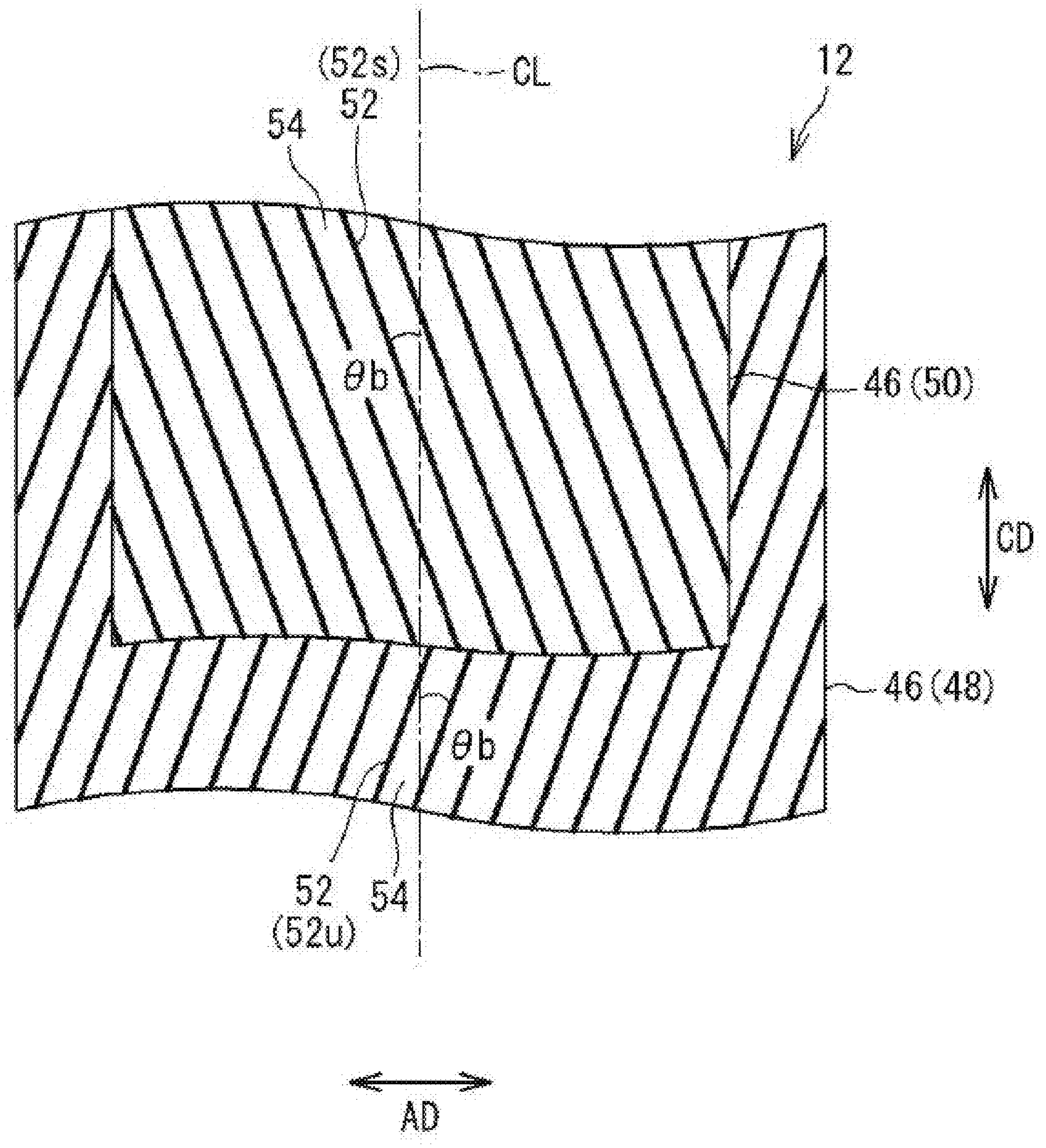
FIG. 2 is a schematic diagram illustrating the configuration of a belt according to one or more embodiments of the present disclosure.

FIG. 2 shows the configuration of the belt 12 according to one or more embodiments of the present disclosure. A direction indicated by a double-headed arrow AD, such as shown in FIG. 2, can be the axial direction of the tire 2. A direction indicated by a double-headed arrow CD, such as shown in FIG. 2, can be the circumferential direction of the tire 2. The front side of the drawing sheet of FIG. 2 can be the radially outer side, and the back side thereof can be the radially inner side.

Each of the plurality of belt plies 46 constituting the belt 12 can include a relatively large number of belt cords 52 aligned with each other. The belt cords 52 can be steel cords. For convenience of description, the belt cords 52 can be represented by solid lines, but the belt cords 52 may be covered with a topping rubber 54.

Each belt cord 52 can be inclined with respect to the equator plane CL. The direction of inclination of the belt cords 52 included in the outer belt ply 50 (hereinafter referred to as outer belt cords **52*s*) can be opposite to the direction of inclination of the belt cords 52 included in the inner belt ply 48 (hereinafter referred to as inner belt cords 52***u*).

The band 14 can be stacked on the belt 12 on the inner side of the tread 4. Each end of the band 14 can be located axially outward of an end of the belt 12. The length from the end of the belt 12 to the end of the band 14 can be not less than 3 mm and not greater than 7 mm, according to one or more embodiments of the present disclosure.

The band 14 of the tire 2 can include a full band 56 and a pair of edge bands 58. The full band 56 can covers the entire belt 12 from the outer side in the radial direction.

The pair of edge bands 58 can be placed so as to be spaced apart from each other in the axial direction with the equator plane CL interposed therebetween. Each edge band 58 can cover an end of the full band 56 from the outer side in the radial direction.

The band 14 may be composed of only the full band 56, or may be composed of only the pair of edge bands 58.

The band 14 can include a helically wound band cord. In the band 14, the band cord can extends substantially in the circumferential direction. Specifically, an angle of the band cord with respect to the circumferential direction may be not greater than 5°. The band 14 can have a jointless structure. A cord formed from an organic fiber can be used as the band cord. Examples of the organic fiber can include nylon fibers, rayon fibers, polyester fibers, and aramid fibers.

The band cord included in the full band 56 and the band cord included in each edge band 58 may be the same, according to one or more embodiments of the present disclosure. The band cord in the full band 56 and the band cord in each edge band 58 may be different.

Each chafer 16 can be located radially inward of the bead 8. The chafer 16 can come into contact with the rim R. In the tire 2, the chafer 16 can include a fabric and a rubber with which the fabric is impregnated.

As shown in FIG. 1, an inner end of the chafer 16 can form a part of an inner surface 2N of the tire 2. An outer end of the chafer 16 can be located radially outward of the inner end thereof. The outer end of the chafer 16 can be located between the bead 8 and the clinch 34.

The inner liner 18 can be located inward of the carcass 10. The inner liner 18 can form the inner surface 2N of the tire 2. The inner liner 18 can be formed from a crosslinked rubber that has an excellent air blocking property. The inner liner 18 can maintain the internal pressure of the tire 2.

Figure 3:
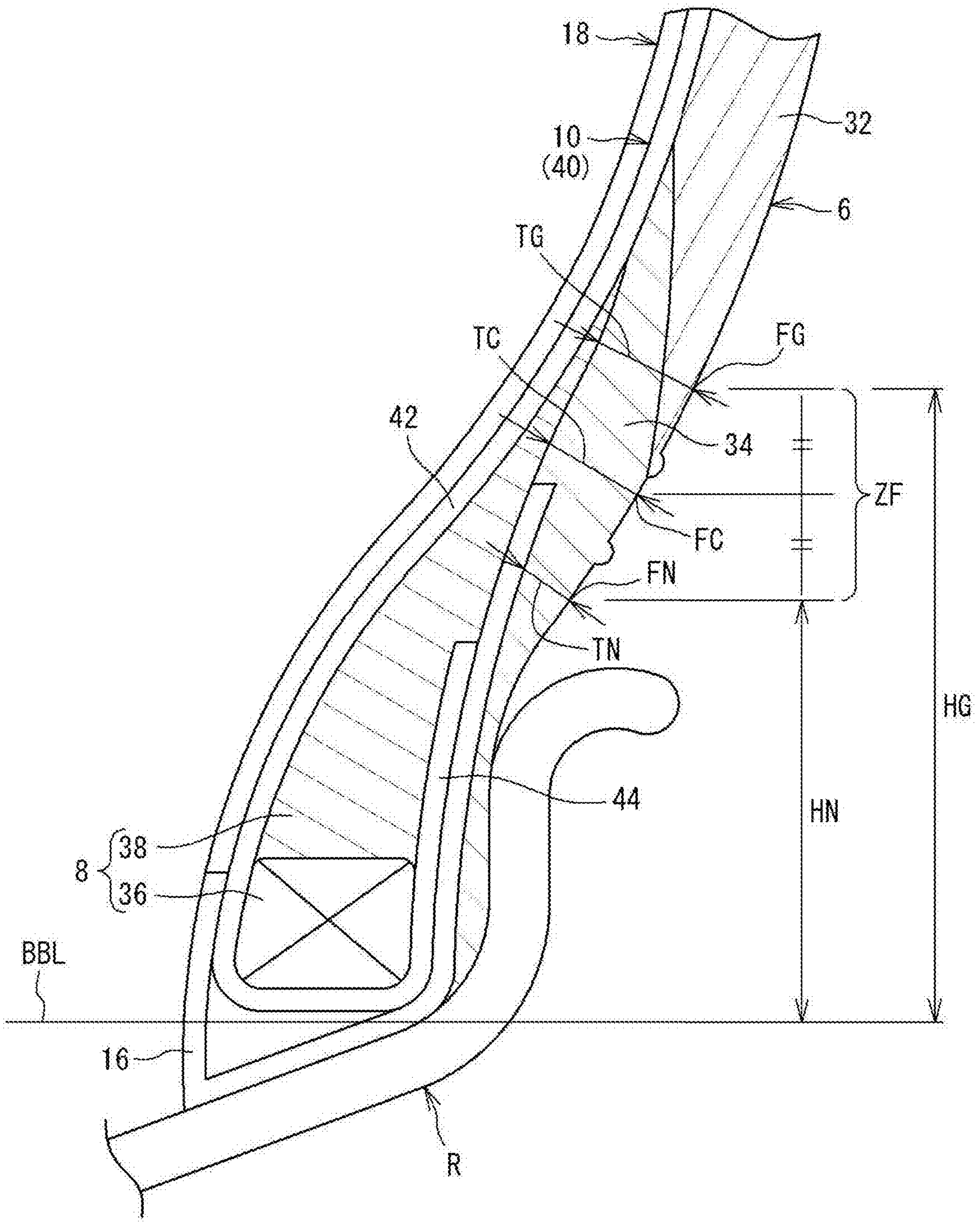
FIG. 3 is an enlarged cross-sectional view showing a bead portion according to one or more embodiments of the present disclosure.

FIG. 3 shows a part of the tire 2 shown in FIG. 1. FIG. 3 shows a bead portion of the bead 8 of the tire 2.

A position indicated by reference character FN, such as shown in FIG. 3, can be a position on the outer surface 2G of the tire 2. A distance HN in the radial direction from the bead base line BBL to the position FN can be 20 mm, as an example.

A position indicated by reference character FG can be a position on the outer surface 2G of the tire 2. A distance HG in the radial direction from the bead base line BBL to the position FG can be 30 mm, as an example.

FIG. 3 shows a zone from the position FN to the position FG as a zone ZF. The zone ZF can be a zone where the distance in the radial direction from the bead base line BBL is 20 mm to 30 mm, as an example.

The position FN can be an inner end of the zone ZF, and the position FG can be an outer end of the zone ZF.

A position indicated by reference character FC can be a point of intersection of a radial center line of the zone ZF and the outer surface 2G of the tire 2. The position FC can be the center of the zone ZF.

Strain may be generated in the tire 2 due to the action of a load. In particular, relatively large compressive strain may be generated in the vicinity of the zone ZF. To prevent damage to the bead portion, the sidewall layer 6 can be formed so as to be thicker in the vicinity of the zone ZF than in the other portion.

A length indicated by a double-headed arrow TN, such as shown in FIG. 3, can be the thickness of the sidewall layer 6 at the inner end FN of the zone ZF. A length indicated by a double-headed arrow TG, such as shown in FIG. 3, can be the thickness of the sidewall layer 6 at the outer end FG of the zone ZF. A length indicated by a double-headed arrow TC, such as shown in FIG. 3, can be the thickness of the sidewall layer 6 at the center FC of the zone ZF. Each of the thickness TN, the thickness TG, and the thickness TC can be measured along a normal line of the outer surface of the tire 2. The thickness TN can be less than the thickness TC and the thickness TG. The thickness TC may be less than the thickness TG.

According to one or more embodiments of the present disclosure, an average thickness F of the sidewall layer 6 in the zone ZF can be represented as the average value of the thickness TN, the thickness TG, and the thickness TC.

Focusing on the fact that a width BW of a belt can influence the contour of a carcass (specifically, a ply body) and that strain generated in each bead portion can increase and the durability of the tire can decrease if the contour of the carcass is distorted, the present inventor has conducted an intensive study on how much average thickness F of the sidewall layer in the zone ZF described above can be regarded as desirable (e.g., enough), for instance, to allow a tire to meet the requirements of a HIGH LOAD CAPACITY type (hereinafter referred to as HLC standard), for instance, as specified in the ETRTO STANDARDS MANUAL 2021, while adjusting the width BW of the belt. As a result, a relational expression shown below has been obtained for the average thickness F of the sidewall layer 6 in the zone ZF.

That is, the average thickness F of the sidewall layer 6 in the zone ZF can satisfy the following formula (1) represented using a constant B and the cross-sectional width SW of the tire 2 and the width BW of the belt 12 obtained in the reference state of the tire 2.

$$416\times(BW/SW-B)^2+4\leq F\leq 416\times(BW/SW-B)^2+6 \quad \text{Formula (1)}$$

The units of the average thickness F, the cross-sectional width SW, and the width BW are mm (millimeters).

Furthermore, the constant B can satisfy the following formula (2) represented using an aspect ratio RA of the tire 2.

$$B=0.84\times(-0.49\times RA/100+1.22) \quad \text{Formula (2)}$$

The "nominal aspect ratio" can be used as the aspect ratio RA in the formula (2). For example, in the case where the tire size of a tire is 205/55R16, this tire can have a nominal aspect ratio RA of 55%. In this case, the constant B can be 0.80.

If the average thickness F is less than 416×(BW/SW−B)$^2$+4, the sidewall layer 6 in the zone ZF can become excessively thin, and there may be a concern that the tire cannot meet the requirements of the HLC standard.

If the average thickness F is greater than $416\times(BW/SW-B)^2+6$, the sidewall layer 6 in the zone ZF can become excessively thick, and there may be a concern that the significance of adopting the carcass 10 which is composed of one carcass ply 40 and has an LTU structure for mass reduction, is lost.

However, when the average thickness F satisfies the above-described formula (1), the width BW of the belt 12 and the thickness of the sidewall layer 6 in the zone ZF can be regarded as well balanced. The average thickness F of the sidewall layer 6 which can commensurate with the width BW of the belt 12 can be set. In other words, the tire 2 can optimize the average thickness F while reducing compressive strain generated in the carcass 10. Since the average thickness F can be set at the required thickness, the tire 2 can achieve mass reduction. Since compressive strain generated in the carcass 10 can be reduced, the tire 2 can meet the requirements of the HLC standard. In particular, by setting the ratio (BW/SW) of the width BW of the belt 12 to the cross-sectional width SW of the tire 2 to be equal to the constant B represented by the formula (2), the tire 2 can meet the requirements of the HLC standard even if the average thickness F of the sidewall layer 6 in the zone ZF is set to 4 to 6 mm, as an example range.

Even though the carcass 10 composed of one carcass ply 40 and having a low turned-up structure can be adopted, the tire 2 can allow the sidewall layer 6 at the bead portion to be effectively made thinner while the stiffness required to meet the requirements of the HLC standard is provided to the tire 2.

The tire 2, according to one or more embodiments, can achieve improvement of durability without an increase in mass.

The radial height CH of the turned-up portion 44 can be not less than 10 mm and not greater than 20 mm, as an example range.

When the radial height CH is set to be not less than 10 mm, the carcass ply 40 can be firmly fixed at the bead 8. The carcass 10 can sufficiently exhibit its function(s). The carcass 10 can contribute to ensuring the stiffness required for the tire 2 to meet the requirements of the HLC standard.

When the radial height CH is set to be not greater than 20 mm, the end of the turned-up portion 44 can be placed away from the vicinity of the zone ZF where large compressive strain may be generated. Occurrence of damage starting from the end of the turned-up portion 44 can be suppressed. The tire 2 can be regarded as having good durability. From this viewpoint, the radial height CH can be not greater than 15 mm, as an example.

Figure 4:
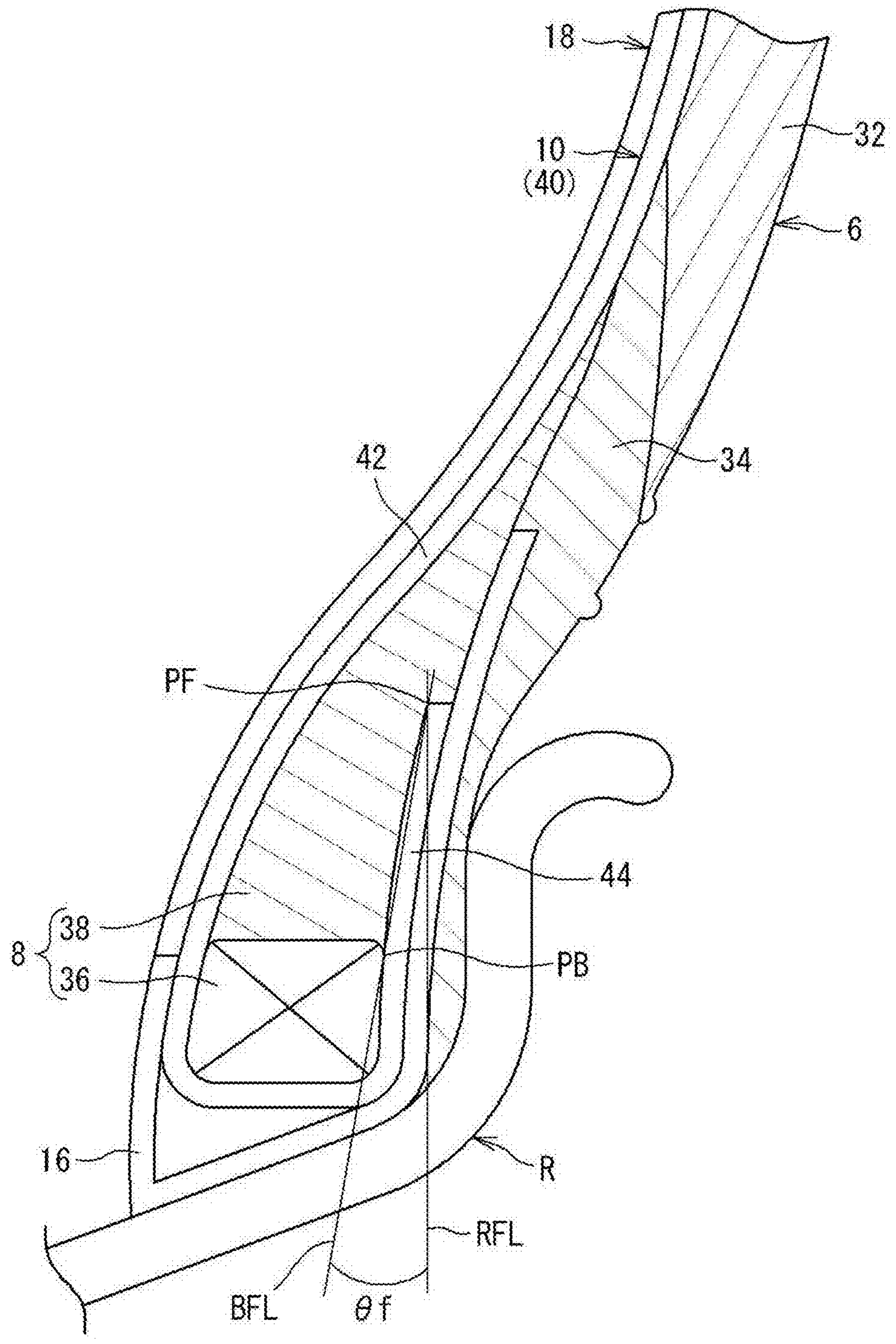
FIG. 4 is an enlarged cross-sectional view showing the bead portion according to one or more embodiments of the present disclosure.

FIG. 4 shows a part of the tire 2 shown in FIG. 1. FIG. 4 shows the bead portion of the bead 8 of the tire 2.

A position indicated by reference character PF, such as shown in FIG. 4, can be the end of the turned-up portion 44. A position indicated by reference character PB, such as shown in FIG. 4, can be the radially outer end of a contact surface between the turned-up portion 44 and the core 36. The radially outer end PB can be a separation point at which the turned-up portion 44 separates from the core 36 (hereinafter referred to as separation point of the turned-up portion 44). A solid line BFL, such as shown in FIG. 4, can be a straight line passing through the separation point PB and the end PF of the turned-up portion 44. A solid line RFL, such as shown in FIG. 4, can be a straight line passing through the end PF of the turned-up portion 44 and extending in the radial direction.

An angle θf is an angle between the straight line BFL and the straight line RFL.

According to one or more embodiments of the present disclosure, the angle θf can be an angle of the turned-up portion 44 with respect to the radial direction.

In the reference state, the angle θf of the turned-up portion 44 with respect to the radial direction can be not less than 15 degrees, for instance. Accordingly, deformation of the turned-up portion 44 due to the action of a load can be effectively suppressed. Damage starting from the end of the turned-up portion 44 can be suppressed. The tire 2 can be regarded as having good durability. From this viewpoint, the angle θf can be not less than 17 degrees.

From the viewpoint of being able to suppress damage starting from the end of the turned-up portion 44, the angle θf can be larger than the examples mentioned above. For instance, the angle θf may not exceed 25 degrees in the reference state. Thus, from the viewpoint that the production of the tire 2 is possible, the angle θf can be not greater than 25 degrees in the reference state.

From the viewpoint that the tire 2 can effectively achieve improvement of durability without an increase in mass, the radial height CH of the turned-up portion 44 can be not less than 10 mm and not greater than 20 mm and the angle θf of the turned-up portion 44 with respect to the radial direction in the reference state can be not less than 15 degrees.

As described above, the belt cords 52 can be inclined with respect to the equator plane CL. An angle θb, such as shown in FIG. 2, can represent an angle of the belt cords 52 included in the belt 12 with respect to the equator plane CL.

From the viewpoint that the belt 12 can effectively contribute to inhibiting the contour of the carcass 10 from being distorted, the angle θb of the belt cords 52 with respect to the equator plane CL in the reference state can be not less than 20 degrees and not greater than 32 degrees, for instance, not less than 24 degrees and/or not greater than 30 degrees. In this case, the angle θb of the belt cords 52 included in the inner belt ply 48 with respect to the equator plane CL and the angle θb of the belt cords 52 included in the outer belt ply 50 with respect to the equator plane CL may be the same.

According to one or more embodiments of the present disclosure, a tire that can achieve improvement of durability without an increase in mass, can be obtained. In particular, according to one or more embodiments of the present disclosure, a HIGH LOAD CAPACITY type tire, such as specified in the ETRTO STANDARDS MANUAL 2021, which can achieve improvement of durability without an increase in mass, can be obtained.

The above-described technology capable of achieving improvement of durability without an increase in mass can be applied to various tires.

Additional Note

The present disclosure can include aspects as described below.

[1] A HIGH LOAD CAPACITY type tire specified in the ETRTO STANDARDS MANUAL 2021, the tire including:

a pair of beads;

a carcass extending on and between the pair of beads;

a pair of sidewall layers located axially outward of the carcass; and a belt located radially outward of the carcass, wherein the pair of beads each include a core and an apex located radially outward of the core, the carcass is composed of one carcass ply, the carcass ply includes a ply body extending between a pair of the cores and a pair of turned-up portions connected to the ply body and turned up at the respective cores, each of radial heights of the pair of turned-up portions is not greater than 17% of a cross-sectional height of the tire, an average thickness F of the sidewall layer in a zone where a distance in a radial direction from a bead base line is 20 mm to 30 mm satisfies the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, and the constant B satisfies the following formula (2) represented using an aspect ratio RA of the tire, $$416\times(BW/SW-B)^2+4\leq F\leq 416\times(BW/SW-B)^2+6,\text{ and}\quad\text{formula (1)}$$

$$B=0.84\times(-0.49\times RA/100+1.22).\quad\text{formula (2)}$$

[2] The tire according to [1] above, wherein each of the radial heights of the pair of turned-up portions is not less than 10 mm and not greater than 20 mm.

[3] The tire according to [1] or [2] above, wherein an angle of each of the turned-up portions with respect to the radial direction in the reference state is not less than 15 degrees.

[4] The tire according to any one of [1] to [3] above, wherein the belt includes a large number of belt cords aligned with each other, and an angle of each of the belt cords with respect to an equator plane in the reference state is not less than 20 degrees and not greater than 32 degrees.

[5] The tire according to any one of [1] to [4], wherein the radial height of each of the turned-up portions is defined in the radial direction from the bead base line to an end of the turned-up portion.

[6] The tire according to any one of [1] to [5], wherein the angle for each of the turned-up portions with respect to the radial direction in the reference state is not greater than 25 degrees.

[7] The tire according to any one of [1] to [6], wherein the carcass has only the one carcass ply.

[8] The tire according to any one of [1] to [7], wherein a ratio BW/SW of the width BW of the belt to the cross-sectional width of the tire is not less than 0.65 and not greater than 1.00.

[9] The tire according to any one of [1] to [8], wherein each of the sidewall layers includes a sidewall body and a clinch, the clinch being between the sidewall body and a chafer in which a corresponding one of the beads is provided.

[10] The tire according to any one of [1] to [9], wherein a portion of the clinch at the zone constitutes a thickest part of the clinch.

[11] The tire according to any one of [1] to [10], wherein each of the sidewall layers decreases in thickness from the zone toward the bead base line.

[12] The tire according to [2] above, wherein an angle of each of the turned-up portions with respect to the radial direction in the reference state is not less than 15 degrees.

[13] The tire according to claim [12], wherein the radial height of each of the turned-up portions is defined in the radial direction from the bead base line to an end of the turned-up portion, and the angle for each of the turned-up portions with respect to the radial direction in the reference state is not greater than 25 degrees.

[14]. The tire according to claim or [13], wherein the carcass consists of the one carcass ply.

[15] The tire according to [2] above, wherein the belt includes a plurality of belt cords aligned with each other, and an angle of each of the belt cords with respect to an equator plane in the reference state is not less than 20 degrees and not greater than 32 degrees.

[16] The tire according to [15], wherein the radial height of each of the turned-up portions is defined in the radial direction from the bead base line to an end of the turned-up portion, and the carcass consists of the one carcass ply.

[17] The tire according to or [16], wherein each of the sidewall layers decreases in thickness from the zone toward the bead base line.

[18] A HIGH LOAD CAPACITY tire specified in the ETRTO STANDARDS MANUAL 2021, the tire comprising:

a pair of beads;

a carcass extending on and between the pair of beads;

a pair of sidewall layers axially outward of the carcass; and a belt radially outward of the carcass, wherein the pair of beads each include a core and an apex radially outward of the core, the carcass is composed of a carcass ply, the carcass ply includes a ply body extending between the cores and the turned-up portions connected to the ply body and turned up at the respective cores, each radial height of the turned-up portions is not greater than 17% of a cross-sectional height of the tire, an average thickness F of the sidewall layer in a zone where a distance in a radial direction from a bead base line is 20 mm to 30 mm satisfies the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, the constant B satisfies the following formula (2) represented using an aspect ratio RA of the tire, $$416\times(BW/SW-B)^2+4\leq F\leq 416\times(BW/SW-B)^2+6,\text{ and}\quad\text{formula (1)}$$

$$B=0.84\times(-0.49\times RA/100+1.22),\quad\text{formula (2)}$$

the radial height of each of the turned-up portions is not less than 10 mm and not greater than 20 mm, an angle of each of the turned-up portions with respect to the radial direction in the reference state is not less than 15 degrees, the belt includes a plurality of belt cords aligned with each other, and an angle of each of the belt cords with respect to an equator plane in the reference state is not less than 20 degrees and not greater than 32 degrees.

[19] The tire according to [18], wherein the radial height of each of the turned-up portions is defined in the radial direction from the bead base line to an end of the turned-up portion, and the angle for each of the turned-up portions with respect to the radial direction in the reference state is not greater than 25 degrees.

[20] The tire according to or [19], wherein the carcass has only the one carcass ply, each of the sidewall layers includes a sidewall body and a clinch, the clinch being between the sidewall body and a chafer in which a corresponding one of the beads is provided, and a portion of the clinch at the zone constitutes a thickest part of the clinch.

What is claimed is:

1. A HIGH LOAD CAPACITY tire specified in the ETRTO STANDARDS MANUAL 2021, the tire comprising:

a pair of beads;

a carcass extending on and between the pair of beads;

a pair of sidewall layers axially outward of the carcass;

a belt radially outward of the carcass; and a chafer, wherein the pair of beads each include a core and an apex radially outward of the core, the carcass is composed of a carcass ply, the carcass ply including:

a ply body extending between the cores, and respective turned-up portions connected to the ply body and turned up at the respective cores, the chafer has a portion axially inward of an axial inner most portion of a corresponding one of the beads, the ply body is between said portion of the chafer and the axially inner most portion of the corresponding one of the beads in an axial direction, the chafer directly contacts the apex of the corresponding ones of the beads, each radial height of the turned-up portions is not greater than 17% of a cross-sectional height of the tire, an average thickness F of the sidewall layer in a zone where a distance in a radial direction from a bead base line is 20 mm to 30 mm satisfies the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, the constant B satisfies the following formula (2) represented using an aspect ratio RA of the tire, $$416\times(BW/SW-B)^2+4\leq F\leq 416\times(BW/SW-B)^2+6, \text{ and} \quad \text{formula (1)}$$

$$B=0.84\times(-0.49\times RA/100+1.22), \quad \text{formula (2)}$$

each of the sidewall layers includes a sidewall body and a clinch, the clinch being between the sidewall body and the chafer in which the corresponding one of the beads is provided, a portion of the clinch within the zone constitutes a thickest part of the clinch, a combined thickness of the sidewall body and the clinch at an upper limit of the zone is greater in thickness compared to a first thickness of the clinch at a lower limit of the zone and compared to a second thickness of the clinch at a center portion of the zone, and for the combined thickness at the upper limit of the zone, the sidewall body and the clinch each have non-zero thickness values.

2. The tire according to claim 1, wherein the radial height of each of the turned-up portions is not less than 10 mm and not greater than 20 mm, and the chafer is adapted to directly contact the standardized rim.

3. The tire according to claim 2, wherein the radial height of each of the turned-up portions is defined in the radial direction from the bead base line to an end of the turned-up portion.

4. The tire according to claim 2, wherein an angle of each of the turned-up portions with respect to the radial direction in the reference state is not less than 15 degrees.

5. The tire according to claim 4, wherein the radial height of each of the turned-up portions is defined in the radial direction from the bead base line to an end of the turned-up portion, and the angle for each of the turned-up portions with respect to the radial direction in the reference state is not greater than 25 degrees.

6. The tire according to claim 4, wherein the carcass consists of the one carcass ply.

7. The tire according to claim 2, wherein the belt includes a plurality of belt cords aligned with each other, and an angle of each of the belt cords with respect to an equator plane in the reference state is not less than 20 degrees and not greater than 32 degrees.

8. The tire according to claim 7, wherein the radial height of each of the turned-up portions is defined in the radial direction from the bead base line to an end of the turned-up portion, and the carcass consists of the one carcass ply.

9. The tire according to claim 7, wherein each of the sidewall layers decreases in thickness from the zone toward the bead base line.

10. The tire according to claim 1, wherein an angle of each of the turned-up portions with respect to the radial direction in the reference state is not less than 15 degrees.

11. The tire according to claim 10, wherein the angle for each of the turned-up portions with respect to the radial direction in the reference state is not greater than 25 degrees.

12. The tire according to claim 1, wherein the belt includes a plurality of belt cords aligned with each other, and an angle of each of the belt cords with respect to an equator plane in the reference state is not less than 20 degrees and not greater than 32 degrees.

13. The tire according to claim 1, wherein the carcass has only the one carcass ply.

14. The tire according to claim 1, wherein a ratio BW/SW of the width BW of the belt to the cross-sectional width of the tire is not less than 0.65 and not greater than 1.00.

15. The tire according to claim 1, wherein each of the sidewall layers decreases in thickness from the zone toward the bead base line.

16. A HIGH LOAD CAPACITY tire specified in the ETRTO STANDARDS MANUAL 2021, the tire comprising:

a pair of beads;

a carcass extending on and between the pair of beads;

a pair of sidewall layers axially outward of the carcass; and a belt radially outward of the carcass, wherein the pair of beads each include a core and an apex radially outward of the core, the carcass is composed of a carcass ply, the carcass ply including:

a ply body extending between the cores, and respective turned-up portions connected to the ply body and turned up at the respective cores, each radial height of the turned-up portions is not greater than 17% of a cross-sectional height of the tire, the radial height of each of the turned-up portions is defined in a radial direction from a bead base line to an end of the turned-up portion, an average thickness F of the sidewall layer in a zone where a distance in the radial direction from the bead base line is 20 mm to 30 mm satisfies the following formula (1) represented using a constant B and a cross-sectional width SW of the tire and a width BW of the belt obtained in a reference state where the tire is fitted on a standardized rim, an internal pressure of the tire is adjusted to 290 kPa, and no load is applied to the tire, the constant B satisfies the following formula (2) represented using an aspect ratio RA of the tire, $$416\times(BW/SW-B)^2+4\leq F\leq 416\times(BW/SW-B)^2+6, \text{ and} \qquad \text{formula (1)}$$

$$B=0.84\times(-0.49\times RA/100+1.22), \qquad \text{formula (2)}$$

the radial height of each of the turned-up portions is not less than 10 mm and not greater than 20 mm, an angle of each of the turned-up portions with respect to the radial direction in the reference state is not less than 15 degrees and not greater than 25 degrees, wherein the angle is defined by a vertex at a first position at the end of the turned-up portion, a first straight line from the vertex through a separation point at which the turned-up portion extends radially outward from a core of the bead, and a second straight line extending radially inward from the vertex, the belt includes a plurality of belt cords aligned with each other, an angle of each of the belt cords with respect to an equator plane in the reference state is not less than 20 degrees and not greater than 32 degrees, each of the sidewall layers includes a sidewall body and a clinch, the clinch being between the sidewall body and a chafer in which the corresponding one of the beads is provided, a portion of the clinch within the zone constitutes a thickest part of the clinch, and a combined thickness of the sidewall body and the clinch at an upper limit of the zone is greater in thickness compared to a first thickness of the clinch at a lower limit of the zone and compared to a second thickness of the clinch at a point of intersection of a radial center line of the zone and an outer surface of the tire, a straight line passes through a first position on the outer surface of the tire at the upper limit of the zone, a second position on the outer surface of the tire at the lower limit of the zone, and a third position on the outer surface of the tire at the point of intersection, and for the combined thickness at the upper limit of the zone, the sidewall body and the clinch each have non-zero thickness values.

17. The tire according to claim 16, wherein the carcass has only the one carcass ply, and a lower-most interface between the sidewall body and the clinch is between the upper limit and the lower limit of the zone.

18. The tire according to claim 16, wherein the separation point is at a radial outermost and axial outermost portion of the core, a height of the zone in the radial direction is 4 mm to 6 mm, an aspect ratio of a cross-sectional height to a cross-sectional width is 55%, a ratio BW/SW of the width BW of the belt to the cross-sectional width of the tire is not less than 0.65 and not greater than 1.00, the ply body is between a portion of the chafer and an axially inner most portion of the corresponding one of the beads in an axial direction, and the chafer is adapted to directly contact the rim with the corresponding one of the beads positioned in a receptacle formed by the chafer.

* * * * *